United States Patent [19]
Yamada et al.

[11] Patent Number: 5,190,800
[45] Date of Patent: Mar. 2, 1993

[54] OPTICAL RECORDING MEDIUM

[75] Inventors: Takashi Yamada; Fumio Matsui, both of Saitama, Japan

[73] Assignee: Pioneer Electronic Corporation, Tokyo, Japan

[21] Appl. No.: 716,875

[22] Filed: Jun. 18, 1991

[30] Foreign Application Priority Data

Jan. 17, 1991 [JP] Japan .................................. 3-003765

[51] Int. Cl.$^5$ .............................................. B32B 3/00
[52] U.S. Cl. ........................................ 428/64; 428/65;
428/457; 428/913; 430/945; 346/76 L;
346/135.1; 369/288
[58] Field of Search .................... 428/64, 65, 457, 913;
430/945; 346/76 L, 135.1; 369/288

[56] References Cited

U.S. PATENT DOCUMENTS

| 5,100,711 | 3/1992 | Satake et al. | 428/64 |
| 5,118,548 | 6/1992 | Ohkibo et al. | 428/64 |
| 5,139,837 | 8/1992 | Kalyanaraman et al. | 428/64 |

Primary Examiner—Patrick J. Ryan
Assistant Examiner—Elizabeth Evans
Attorney, Agent, or Firm—Sughrue, Mion, Zinn, Macpeak & Seas

[57] ABSTRACT

An optical recording medium has a recording layer formed on a substrate possessing a light transmissive property, through which a light for recording and reproducing is irradiated to the recording layer. The substrate contains a light absorbent so as to allow only the light for recording and reproducing to pass through the substrate. The recording medium exhibits a good light-resistance.

15 Claims, 2 Drawing Sheets

TRANSMISSION SPECTRUM OF INDOLENINEPENTAMETHINECYANINE SINGLE LAYER

OPTICAL RECORDING MEDIUM

FIELD OF THE INVENTION

This invention relates to a recording medium capable of optical recording and having good light-resistance.

BACKGROUND OF THE INVENTION

Hitherto, organic dyes such as cyanine dyes have been well-known to be used in a recording layer for optical recording media. Widely used optical recording media having such an organic-dye recording layer are kept in cartridges equipped with a shutter and the recording layer is exposed to light only through an opening of the shutter upon recording and reproducing, ensuring prevention of deterioration by light and attaining easy handling and storage.

Efforts have been directed toward developing an optical recording medium adapted to the standards of a compact disk (CD) player in civil use so that it can be mounted on the CD player as it is. However, the medium adapted to the standards of the CD player is not kept in shape in the cartridge, and therefore the recording layer of the medium suffers marked deterioration by an ordinary light when the recording layer is composed of, for example, a cyanine dye which exhibits high absorption in the visible light region other than the wavelength of light for recording and reproducing (generally 780 nm), as is apparent from FIG. 3 showing its light absorption property (ordinate: transmittance (%), abscissa: wavelength (nm).

SUMMARY OF THE INVENTION

An object of this invention is to provide an optical recording medium having excellent light-resistance and being free from deterioration by the ordinary light.

As a result of an intensive study to eliminate the above-mentioned problem, it has been found that the object can be attained by an optical recording medium having a recording layer formed on a substrate possessing a light transmissive property, through which a light for recording and reproducing is thrown to the recording layer, wherein the substrate contains a light absorbent so as to allow only the light for recording and reproducing to pass through the substrate.

DETAILED EXPLANATION OF THE INVENTION

An optical recording medium of this invention is explained in detailed below, with reference to the drawings.

Figure 1:
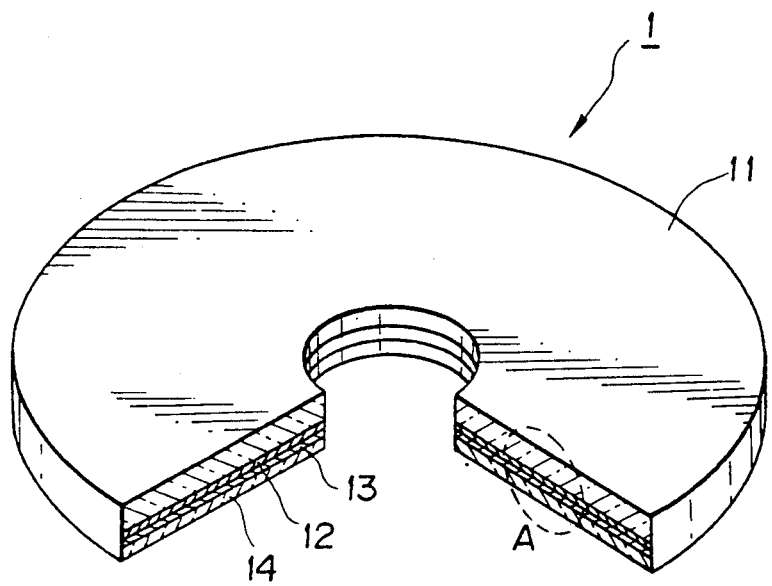
FIG. 1 is a perspective view of an optical recording medium of this invention, a part of which is cut off to show a cross section of the medium.
Figure 2:
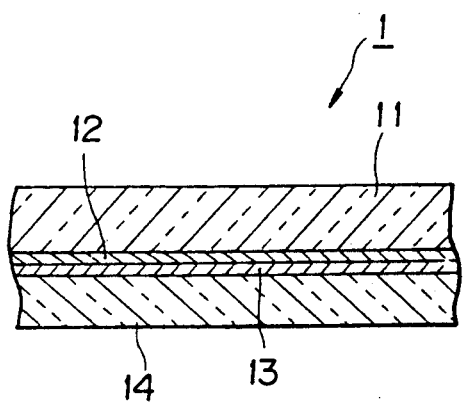
FIG. 2 is an enlarged cross section view of a portion A in FIG. 1.
Figure 3:
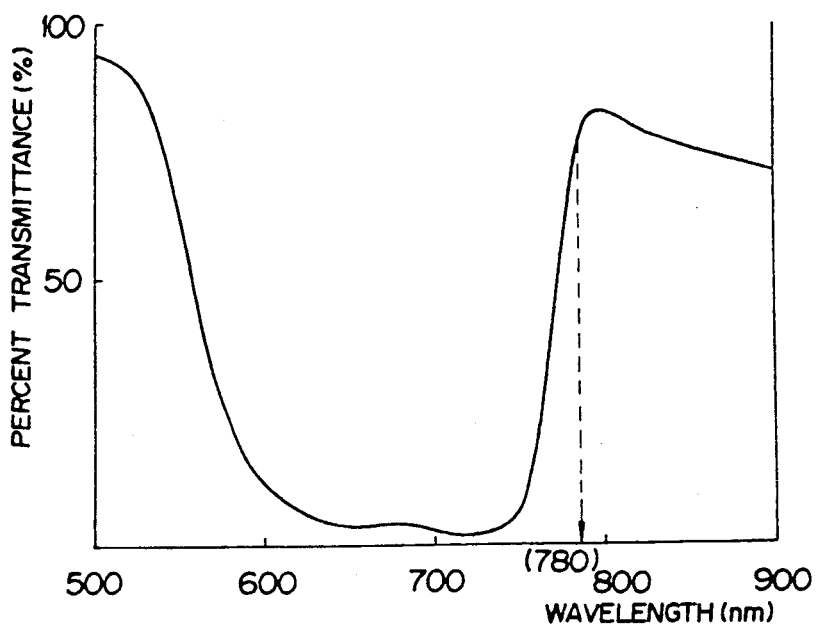
FIG. 3 is a graph showing a light absorptive property of a recording layer of a cyanine dye (indoleninepentamethinecyanine)

FIGS. 1 and 2 show one embodiment of this invention. As shown in FIGS. 1 and 2, the optical recording medium 1 comprises a substrate 11 having thereon a recording layer 12, a light reflective layer 13 and a protective layer 14 in this order.

The substrate 11 is composed of a transparent resin material such as polycarbonate and polymethyl methacrylate as a base material, and contains a light absorbent therein. In view of productivity of the substrate, it is preferably produced by injection-molding after mixing the light absorbent and the base material.

The light absorbent is a substrate capable of selectively absorbing a light of certain wavelength, and more particularly the substance capable of absorbing the light other than a light for recording and reproducing. The substrate containing such a substance operates as a filter allowing only the recording and reproducing light to pass through. The light absorbent is properly selected depending on the wavelength of the recording and reproducing light used. In the case of recording or reproducing by using a light having a wavelength in a range of 750 to 850 nm (particularly, a light of 780 or 830 nm which is practically used), for example, inorganic pigments such as cadmium red, red iron oxide, molybdenum red, molybdate orange, vermilion and red lead (or minium), and organic pigments such as quinacridones, isoindolines, threnes, perylenes and perynones can be used for the purpose. In the case of recording or reproducing by using a light having a wavelength other than 780 nm and 830 nm, there may be used yellow pigments such as cadmium yellow and Oil Yellow 2G; orange pigments such as chromium vermilion and cadmium orange; red pigments such as red iron oxide, cadmium red, Permanent Red 4R, Bordeaux 10B and Oil Red; violet pigments such as cobalt violet and Anthraquinone Violet; blue pigments such as ultramarine, prussian blue, cobalt blue, Phathalocyanine Blue, Anthraquinone Blue and Indanthrene Blue; green pigments such as Phthalocyanine Green; and UV absorbents such as benzophenones, benzotriazoles and phenyl salicylate.

As the substrate of the optical recording medium is desired to absorb light of almost the entire wavelength region other than the wavelength of the recording and reproducing light, a mixture of two or more light absorbents or an additional UV absorbent may be used. The light absorbent is generally incorporated into the substrate in such an amount that the substrate exhibits a light transmittance of at least 80%, with respect to the recording and reproducing light. If it is less than 80%, an amount of light becomes insufficient for recording and reproducing.

The substrate 11 generally has a thickness of about 1.0 to about 1.5 mm, and it is coated with the recording layer 12 containing various kinds of known materials capable of optical recording, such as cyanine dyes, phthalocyanine dyes, quinones and the like. The recording layer 12 may further contain a quencher to prevent the dye from being deteriorated by the light.

The recording layer 12 containing the dye and optionally a quencher is coated on the substrate 11 in a conventional manner, e.g., by dissolving the materials capable of optical recording in a solvent and then spin-coating the solution. The solvent is not particularly limited and any known solvents such as diacetone alcohol, ethyl cellosolve, methyl cellosolve, isophorone, methanol, tetrafluoropropanol and dichloroethane can be used. The recording layer 12 generally has a thickness of about 20 to about 2000 nm.

In one embodiment of this invention, the light reflective layer 13 composed of metal (e.g, Au, Ag, Cu and Al) is provided on the recording layer 12 by various vapor plating methods such as vacuum vapor deposition, sputtering, ion plating and the like. The thickness of the light reflective layer 13 is generally about 0.02 to about 2.0 μm.

The protective layer 14 may further be provided on the light reflective layer 13 to protect the light reflective layer 13 and the recording layer 12. The protective layer 14 is generally formed by spin-coating a UV-curable resin on the light reflective layer 13 and irradiating a UV light. Epoxy resins, acrylic resins, silicone resins and urethane resins may also be used for the protective layer 14. The thickness of the layer 14 is generally about 0.1 to about 100 μm.

Further, an interlayer may be provided between the substrate 11 and the recording layer 12 so as to prevent the substrate 11 from being damaged by the solvent used in formation of the recording layer 12. An interlayer may also be provided between the recording layer 12 and the light reflective layer 13 to enhance light absorption or light reflection.

While the above explanation of the invention is directed to a "contact-type" recording medium having both surfaces of recording layer 12 brought into contact with other materials, i.e., substrate 11, light reflective layer 13 or interlayer, the light recording medium of this invention is not limited thereto and may be an "air sandwich-type" recording medium wherein two substrates each having and uncovered recording layer formed thereon are bonded via spacers in such a manner that the recording layers face each other.

In recording, a recording light is thrown pulse-wise onto the optical recording medium of this invention which is ordinarily rotated, whereby a part of the recording layer is fused and sublimed to form pits. The thus formed pits are detected utilizing a difference between a reflectivity of the reproducing light reflected at a pit portion and that reflected at a non-pit portion, for example, while the optical recording medium is rotated.

The present invention is further explained with reference to the following Example, but it should not be construed as being limited thereto.

EXAMPLE

A substrate was injection-molded using pellets (pigment content: 5 wt %) prepared by pelletizing a mixture of polycarbonate as a base material for the substrate and cadmium red pigment as a light absorbent. Onto the substrate, a solution of a cyanine dye (indoleninepentamethinecyanine) in a solvent was spin-coated to form a recording layer, on which a light reflective layer of Au was further provided in a thickness of 1000 angstroms by a vacuum deposition method. Then, a UV-curable resin (photo-polymer) was coated on the light reflective layer to form a protective layer. Thus, an optical recording medium of this invention was prepared.

For preparing a comparative sample, the same procedure was repeated, except that the light absorbent was not incorporated into the substrate.

Figure 4:
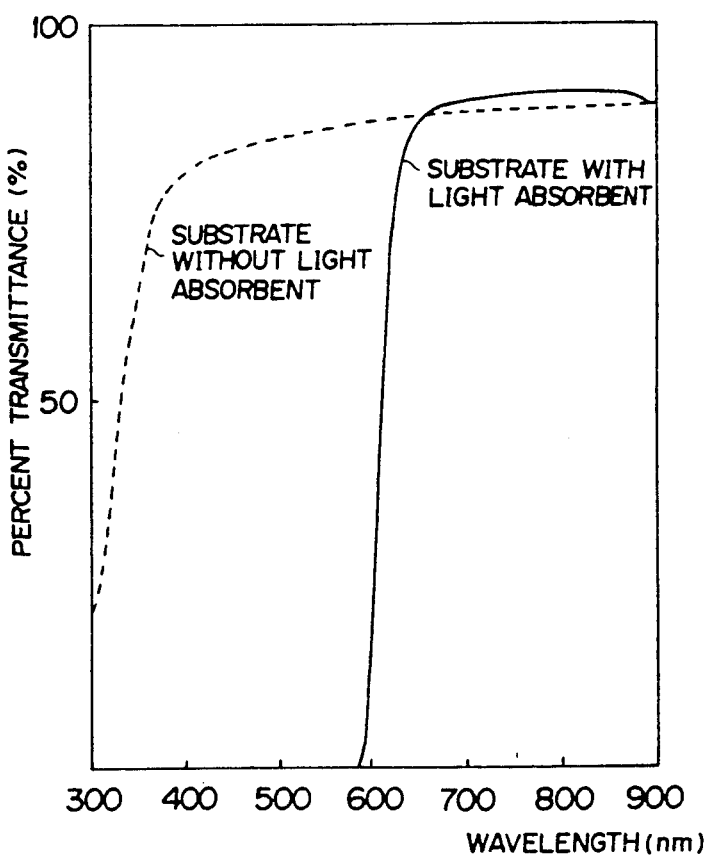
FIG. 4 is a graph showing a light absorptive properties of substrates with and without a light absorbent, respectively.

Light absorption properties of the substrates with and without the light absorbent as prepared above are shown as a solid line and a dotted line, respectively, in FIG. 4.

The thus prepared samples were subjected to a light exposure test under the following conditions:
Light Source
Light source emitting a broad spectrum in the range of about 300 nm to 800 nm.
Illuminance
20000 luxes.
Exposure Time
1000 hours
Temperature
The rise of sample temperature did not occur on account of circulating the air in a test chamber.

The light exposure test revealed that the sample of this invention exhibited markedly improved light-resistance as compared to the comparative sample.

From the above result, the effect of this invention is apparent. That is, the optical recording medium of this invention has a substrate containing a light absorbent so as to allow only a recording and reproducing light to pass through the substrate, so that a recording layer shielded with the substrate is hardly deteriorated by a light even if the medium is exposed to the ordinary light. Thus, the optical recording medium of this invention exhibits excellent light-resistance.

While the invention has been described in detail and with reference to specific embodiments thereof, it will be apparent to one skilled in the art that various changes and modifications can be made without departing from the spirit and scope thereof.

What is claimed is:

1. An optical recording medium having a recording layer formed on a light transmissive substrate, said substrate transmitting at least 80% of light for recording and reproducing on the recording layer, wherein said substrate contains a light absorbent material so as to allow only the light for recording and reproducing to pass through the substrate, and wherein said recording layer contains material capable of optical recording.

2. The optical recording medium according to claim 1, wherein said light absorbent is an inorganic or organic pigment.

3. The optical recording medium according to claim 2, wherein said inorganic pigment is selected from the group consisting of cadmium red, red iron oxide, molybdenum red, molybdate orange, vermilion and red lead.

4. The optical recording medium according to claim 2, wherein said organic pigment is selected from the group consisting of quinacridones, isoindolines, threnes, perylenes and perynones.

5. The optical recording medium according to claim 1, wherein a light reflection layer is further provided on the recording layer.

6. The optical recording medium according to claim 5, wherein said light reflection layer is a metal layer of Au, Ag, Cu or Al.

7. An optical recording medium according to claim 5, wherein said light reflection layer has a thickness of about 0.02 to 2.0 μm.

8. An optical recording medium according to claim 5, wherein a protective layer is formed on the light protective layer.

9. An optical recording medium according to claim 8, wherein said protective layer comprises a resin selected from the group consisting of epoxy resins, acrylic resins, silicone resins, and urethane resins.

10. An optical recording medium according to claim 8, wherein said protective layer has a thickness of about 1 to 10 μm.

11. An optical recording medium according to claim 5, wherein an intermediate layer is disposed between said light reflection layer and said recording layer.

12. The optical recording medium according to claim 1, wherein said recording layer has a thickness of 20 to 2000 nm.

13. The optical recording medium according to claim 1, wherein said material capable of optical recording is a dye selected from the group consisting of cyanine dyes, phthalocyanine dyes, and quinones.

14. An optical recording medium according to claim 1, wherein said substrate has a thickness of about 1.0 to 1.5 mm.

15. An optical recording medium according to claim 1, wherein said recording layer contains a quencher.

* * * * *